United States Patent [19]

Jackson

[11] Patent Number: 5,579,610
[45] Date of Patent: Dec. 3, 1996

[54] LEAF RETAINING NET

[76] Inventor: Robert L. Jackson, 9 Maple Ave., Orangeburg, N.Y. 10962

[21] Appl. No.: 510,676

[22] Filed: Aug. 3, 1995

[51] Int. Cl.⁶ ....................................................... E04D 1/34
[52] U.S. Cl. .......................... 52/4; 52/63; 47/31; 135/141
[58] Field of Search ....................... 52/3, 4, 63; 135/118, 135/141, 913, 119, 142, 139, 115; 47/26 R, 261 F, 31, 32.1 R

[56] References Cited

U.S. PATENT DOCUMENTS

| D. 349,593 | 8/1994 | Hensley . | |
|---|---|---|---|
| 2,922,653 | 1/1960 | O'Brien | 135/118 X |
| 3,862,876 | 1/1975 | Graves | 52/3 X |
| 4,105,412 | 8/1978 | Petzinger . | |
| 4,198,996 | 4/1980 | Keable et al. | 135/141 X |
| 4,366,949 | 1/1983 | Staub, Jr. . | |
| 4,602,664 | 7/1986 | Hullen . | |
| 4,702,478 | 10/1987 | Kruse | 135/913 X |
| 4,738,477 | 4/1988 | Grossmeyer . | |
| 4,955,068 | 9/1990 | Tennihan . | |
| 4,961,981 | 10/1990 | Keegan | 52/3 X |
| 5,066,143 | 11/1991 | Sanders . | |
| 5,217,785 | 6/1993 | Thomas | 52/3 X |
| 5,364,188 | 11/1994 | Godfried et al. . | |
| 5,451,445 | 9/1995 | Wang | 47/31 X |

FOREIGN PATENT DOCUMENTS

| 2643254 | 3/1978 | Germany | 47/31 |
|---|---|---|---|
| 4966 | 3/1903 | United Kingdom | 52/3 |

Primary Examiner—Lanna Mai
Attorney, Agent, or Firm—Terrance L. Siemens

[57] ABSTRACT

A net for covering raked leaves and similar plant debris. The net is bounded on two sides by two telescoping poles. A chain links the ends the ends of the two poles, and a second chain links the remaining ends of the two poles. The net is thus weighted to hug the ground and resist displacement by the wind. The net, being flexible, accommodates leaf piles of different volumes and dimensions. The telescoping poles and flexible chains both hold the net down by gravity, and also influence the overall configuration of the net. Opposing sides of the net attached to the poles remain straight, although of variable length due to telescoping. Opposing sides of the net attached to the chains are reconfigurable due to flexibility of the chains. The net is useful for immediately covering collected leaves, and preventing dispersion by the wind. Also, the net is suitable for longer term use in composting. Rings attached the poles enable stakes to secure the net in place for composting or other long term uses.

10 Claims, 2 Drawing Sheets

LEAF RETAINING NET

BACKGROUND OF THE INVENTION

1. Field of the Invention

The present invention relates to apparatus for retaining fallen leaves and similar plant debris. More particularly, the apparatus includes a net which covers fallen leaves, stakes for optionally securing the apparatus in a selected location on the ground, and weights.

2. Description of the Prior Art

Collection, control, and disposal of plant debris, such as lawn clippings and fallen autumn leaves, has attracted much attention in the prior art. In many cases, the volume of such debris creates a problem in that allowing the debris to accumulate and cover the ground may be intolerable. Debris in sufficient volume can, over time, clump together and prevent new growth of a lawn or other plants. Even when temporarily stored on the ground prior to disposal by removal from the area, it becomes necessary to control the debris, and prevent it from dispersion by wind.

U.S. Pat. No. 4,366,949, issued to Thomas J. Staub, Sr. on Jan. 4, 1983, describes a net for collecting and retaining leaves in place. The net is arranged to occupy a horizontal plane and to extend in a vertical plane. Stakes support the vertical section. The invention operates by providing a floor on which leaves are placed, and a vertical wall which catches leaves driven by the wind from the pile which accumulates on the floor section as the leaves are gathered. The net is disengaged from the stakes and made to surround the leaves to form a bag.

By contrast, the net of the present invention covers leaves rather than providing a floor. Rigid or heavy members of the present invention occupy the entire periphery of the net, so as to hold the net down. This prevents the wind from scattering the leaves immediately upon placement of the net over the leaves.

The present invention is effective regardless of the direction of the wind. In the Staub, Sr. invention, it is necessary to anticipate the direction of the wind in order to locate the vertical section of net effectively. If the wind is swirling, or changes direction, the vertical section may prove ineffective. The present invention may also be employed for long term use, as would be effective in composting. This would not be feasible with the Staub, Sr. invention.

One approach to leaf management is to collect and bag the debris. This approach is exemplified by U.S. Pat. No. 5,364,188, issued to Alan Godfried et al. on Nov. 15, 1994. This invention provides a bag having features particularly suited to bagging lawn debris. By contrast, the present invention has a different focus and appropriately different structure. The present invention immediately provides a cover preventing dispersion by the wind. The structure of the present invention includes a net which does not form a closed structure, such as a bag, but rather a cover. The cover is secured in place by weight, and optionally still more securely by stakes. There is no necessity for immediate bagging, as is the case in bagging inventions.

A composting container is seen in U.S. Pat. No. 4,105,412, issued to Manfred W. A. Petzinger on Aug. 8, 1978. This container is typical of composting apparatus, having a large, rigid container. This invention is intended for composting collected plant debris, and not in controlling recently raked or collected debris. By contrast, the present invention provides immediate control of collected debris, and further also has capabilities of enabling composting. And unlike the large, rigid construction of composting containers, the present invention folds compactly for storage.

A leaf net is shown in U.S. Pat. No. 349,593, issued to Connie M. Hensley on Aug. 9, 1994. While surrounded by a peripheral structure which would prevent wind from unfurling the net, the structure depicted in this patent appears to be permanently planar, and thus unable to adjust for leaf piles of different volumes and dimensions. By contrast, the peripheral structure of the present invention accommodates different volumes and dimensions. Furthermore, the present invention collapses for easier storage and easier manipulation during erection.

None of the above inventions and patents, taken either singly or in combination, is seen to describe the instant invention as claimed.

SUMMARY OF THE INVENTION

The present invention provides apparatus including a net, which adjusts to fit piles of leaves and other plant debris, and which covers the pile. Unlike many prior art devices, the novel apparatus sits atop the plant matter, and thus immediately traps leaves when the apparatus is installed. The leaves can be bagged or otherwise disposed in a subsequent operation.

The net is preferably rectangular, and bounded on two opposed sides by telescoping rods. These rods maintain two opposed sides of the net in a straight configuration, and also stabilize the net by their weight. The other two opposed sides of the net are stabilized by a chain contained within a hem formed in the net.

Overall configuration of the novel apparatus flexibly accommodates the pile of plant debris due to flexibility of the net, telescoping of the rods, and flexibility of the chains. At the same time, the periphery of the net is anchored to one degree or another by the weight of the rods and chains, so that, as soon as the apparatus is in place, leaves are no longer susceptible to being blown away. Even swirling gusts of wind cannot blow away leaves, as could occur with the device of Staub, Sr.

Leaves may be bagged in a subsequent operation, or may be left to decompose by bacterial action. If the latter choice is desired, the novel apparatus may be left on the composting pile to maintain the composting pile in place. Rings for engaging stakes driven into the ground are attached to the telescoping rods to more permanently secure the apparatus in place.

Telescoping rods and flexible chains not only enable adjustment to fit leaf piles of different volumes and configurations, but also enable compact storage of the apparatus when not in use.

It will be appreciated that although the novel apparatus is uncomplicated and not bulky, it serves the dual purposes of retaining leaves in windy conditions, and also is usable as a composting container.

Accordingly, it is a principal object of the invention to provide apparatus having a net for retaining piled leaves in place.

It is another object of the invention that the apparatus be immediately effective upon being set in place.

It is a further object of the invention to resist displacement of the net by wind blowing in any direction.

Still another object of the invention is to provide adjustment of the configuration of the net to accommodate leaf piles of different volumes and dimensions.

An additional object of the invention is to resist displacement by weights arranged advantageously about the periphery of the net.

It is again an object of the invention to immobilize the leaf pile during long term, natural decomposition.

Yet another object of the invention is to enable compact storage of the novel apparatus.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
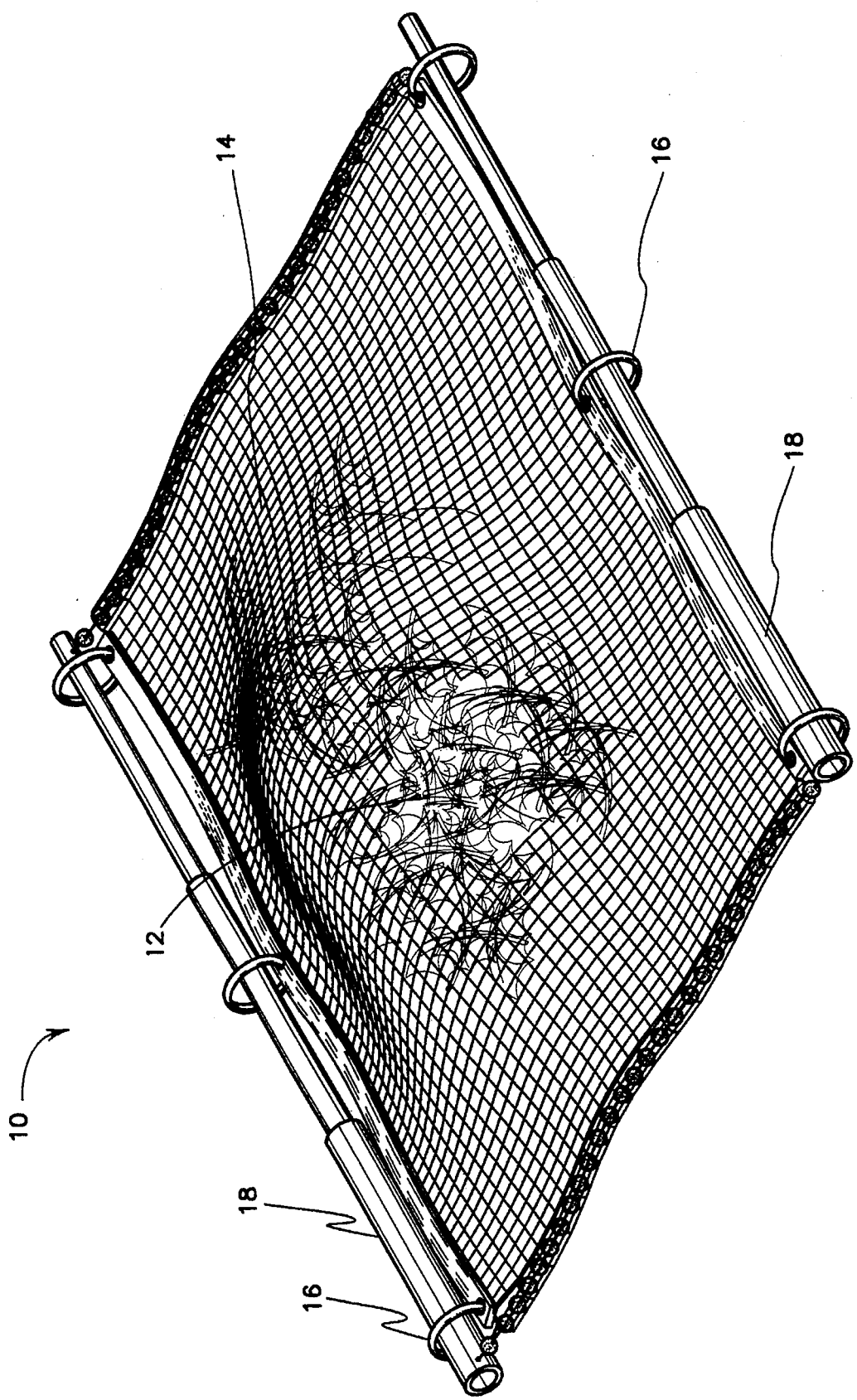
FIG. 1 is a perspective view of the invention, partially broken away to reveal plant matter retained by the net.

Turning now to FIG. 1 of the drawings, the novel plant debris retaining apparatus 10 is seen covering a pile of leaves or other plant debris 12. Apparatus 10 includes a net 14 fabricated from a flexible material, such as a polyester synthetic resin, so that it accommodates the volume and dimensions of a pile of leaves. Net 14 is preferably rectangular, having two pairs of opposed lateral borders. At two opposed lateral borders, net 14 has rings 16 anchored thereto, for loosely encircling telescoping rods 18. Rods 18 maintain their respective borders straight, adjustably vary the effective length of net 14, and provide means for manipulating net 14 into place, thus enabling a user to position the entire net 14 as desired. Rods 18 are easily removed from engagement with net 14. When collapsed, rods 18 are compact for storage. Net 14, being flexible, is also compact for storage.

Figure 2:
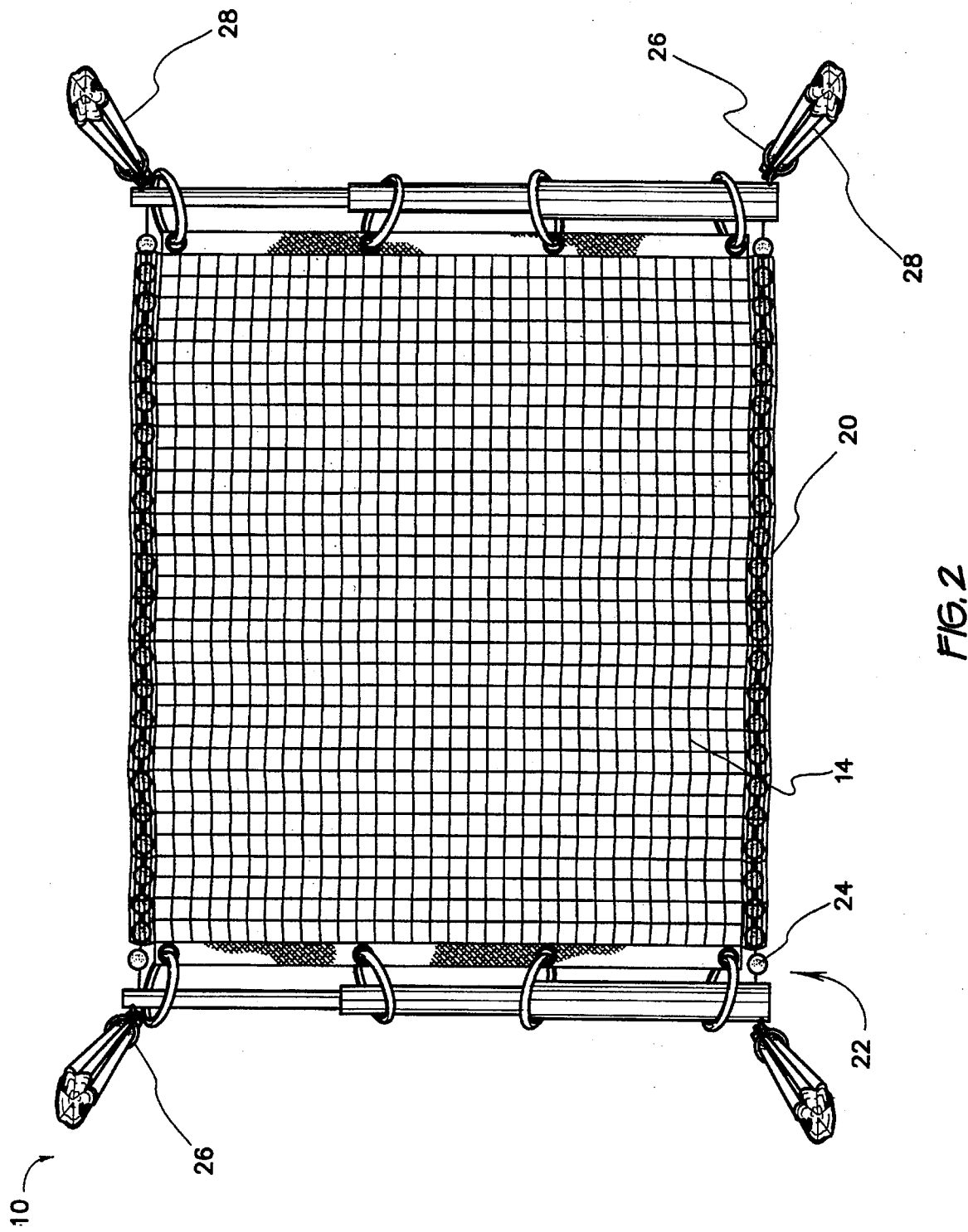
FIG. 2 is a top plan view of the invention.

Turning now to FIG. 2, net 14 is seen to have hems 20 extending along the remaining two opposed lateral borders, each of the remaining borders located serially between each of the aforementioned borders. Hems 20 each define an enclosed passageway extending therethrough. A chain 22 is disposed within each hem 20, penetrating and entrapped by its respective hem 20. Each chain 22 is attached to one end of each rod 18.

Chains 22 are preferably of the type including a series of heavy spheres 24 linked to adjacent spheres 24. Spheres 24 could be fabricated from any metal or other durable, heavy material. In one construction, for example, spheres could have throughbores and be linked by a cable passing through all throughbores.

Alternatively, other suitable forms of chain 22 may be substituted. As examples, heavy cable or a chain having interlocked links (neither shown) could be employed.

Rods 18 and chains 22 cause weight to be applied at the periphery of net 14. This weighting is sufficient to resist wind, and may further deter small animals, so that leaves will be retained in place despite adverse weather conditions.

It would be possible to omit chains 22, and rely solely on rods 18 for weighting. If this is the case, then rods 18 must be formed from a suitably heavy material. If chains 22 are employed, then the requirement for weight of rods 18 lessens. However, it is preferred to include chains 22, since one of the advantages of employing chains 22 is that they assist in retaining rods 18 parallel and in place.

Regardless of the degree of weight provided, and its exact location, sufficient total weight must be present in order to immobilize net 14 against displacement by the wind.

Another feature of apparatus 10 is that rings 26 are attached at each end of each rod 18. Rings 26 engage stakes 28 driven into the ground for maintaining apparatus 10 in place for extended periods of time, or for more surely securing apparatus 10 in place. An example of a long term usage of apparatus 10 is to assist in composting or long term disintegration of plant debris.

It will occur to those of skill in the art that modifications to the apparatus can be made. For example, rods 18 must not necessarily telescope. They will work equally effectively when deployed if not able to telescope, but merely will present more requirement for space when storing. Also, chains 22 may be attached to net 14 in ways other than by entrapment within hem 20, such as by tethering. It would further be possible that net 14 not be rectangular. If circular, it would be possible to delete rods 18, and rely upon chain 22 or its equivalent for peripheral weighting.

In still another departure from the embodiments described above, chain 22 could be deleted in favor of a succession of weights permanently attached to net 14, but not linked to one another. These and still other modifications to the invention may be made without departing from the inventive concept.

It is to be understood that the present invention is not limited to the embodiments described above, but encompasses any and all embodiments within the scope of the following claims.

I claim:

1. A plant debris retaining net for covering and retaining in place collected plant debris, said retaining net comprising:

a flexible net having a first lateral border and a second lateral border, and means for attachment to a rod located at said first lateral border and said second lateral border;

a first rod located at said first lateral border, said first rod attached to said net by said means for attachment to a rod; and a second rod located at said second lateral border, said second rod attached to said net by said means for attachment to a rod, said first rod and said second rod maintaining said first lateral border and said second lateral border of said net in a straight configuration, and said first rod and said second rod providing weight for immobilizing said first lateral border and said second lateral border of said net, thereby resisting displacement of said net by the wind;

means for providing telescoping adjustment of length of said first rod and said second rod, said plant debris retaining net thus having an adjustably variable length dimension;

a chain having a first end and a second end, said first end of said chain connected to said first rod and said second end of said chain connected to said second rod, whereby said first rod and said second rod are further immobilized by weights.

2. The plant debris retaining net according to claim 1, further comprising a plurality of rings each attached to one of said first rod and said second rod, for engagement of stakes for staking said net to the ground.

3. The plant debris retaining net according to claim 1, said chain being a ball chain comprising spheres and links joining adjacent spheres.

4. The plant debris retaining net according to claim 1, said net further comprising a third lateral border located serially between said first lateral border and said second lateral border, and a hem extending along said third lateral border, said hem defining an enclosed passageway extending through said hem, said chain penetrating and being entrapped within said hem, whereby said net is further immobilized by weights.

5. A plant debris retaining net for covering and retaining in place collected plant debris, said retaining net comprising:

a flexible net having a first lateral border and a second lateral border, and means for attachment to a rod located at said first lateral border and said second lateral border;

a first rod located at said first lateral border, said first rod attached to said net by said means for attachment to a rod; and a second rod located at said second lateral border, said second rod attached to said net by said means for attachment to a rod, said first rod and said second rod each further comprising means for providing telescoping adjustment of length of said first rod and said second rod, said plant debris retaining net thus having an adjustably variable length dimension, said first rod and said second rod maintaining said first lateral border and said second lateral border of said net in a straight configuration, and said first rod and said second rod providing weight for immobilizing said first lateral border and said second lateral border of said net, thereby resisting displacement of said net by the wind;

a plurality of rings each attached to one of said first rod and said second rod, for engagement of stakes for staking said net to the ground.

6. The plant debris retaining net according to claim 5, said net further comprising a third lateral border located serially between said first lateral border and said second lateral border, and said plant debris retaining net further comprising:

a chain having a first end and a second end; and a hem extending along said third lateral border, said hem defining an enclosed passageway extending through said hem, said chain penetrating and being entrapped within said hem, said first end of said chain connected to said first rod and said second end of said chain connected to said second rod, whereby said first rod and said second rod are further immobilized by weights.

7. The plant debris retaining net according to claim 6, said chain being a ball chain comprising spheres and links joining adjacent spheres.

8. A plant debris retaining net for covering and retaining in place collected plant debris, said retaining net comprising:

a flexible net having a first lateral border, a second lateral border, and a third lateral border located serially between said first lateral border and said second lateral border, and means for attachment to a rod located at said first lateral border and said second lateral border, and a hem extending along said third lateral border;

a first rod located at said first lateral border, said first rod attached to said net by said means for attachment to a rod;

a second rod located at said second lateral border, said second rod attached to said net by said means for attachment to a rod, said first rod and said second rod each further comprising means for providing telescoping adjustment of length of said first rod and said second rod, said plant debris retaining net thus having an adjustably variable length dimension, said first rod and said second rod maintaining said first lateral border and said second lateral border of said net in a straight configuration, and said first rod and said second rod providing weight for immobilizing said first lateral border and said second lateral border of said net, thereby resisting displacement of said net by the wind; and a chain having a first end and a second end, said hem defining an enclosed passageway extending through said hem, said chain penetrating and being entrapped within said hem, said first end of said chain connected to said first rod and said second end of said chain connected to said second rod, whereby said net and said first rod and said second rod are further immobilized by weights.

9. The plant debris retaining net according to claim 8, further comprising a plurality of rings each attached to one of said first rod and said second rod, for engagement of stakes for staking said net to the ground.

10. The plant debris retaining net according to claim 8, said chain being a ball chain comprising spheres and links joining adjacent spheres.

* * * * *